US012750596B2

(12) United States Patent
Yu

(10) Patent No.: US 12,750,596 B2
(45) Date of Patent: Sep. 29, 2026

(54) METHOD OF HIGH-RESOLUTION COMPUTATIONAL IMAGING THROUGH CHECKERBOARD CONSTELLATION-BASED OPTICAL PUPIL PLANE INTERFERENCE

(71) Applicant: Shanghai Institute of Technical Physics, Chinese Academy of Sciences, Shanghai (CN)

(72) Inventor: Qinghua Yu, Shanghai (CN)

(73) Assignee: Shanghai Institute of Technical Physics, Chinese Academy of Sciences, Shanghai (CN)

( * ) Notice: Subject to any disclaimer, the term of this patent is extended or adjusted under 35 U.S.C. 154(b) by 166 days.

(21) Appl. No.: 18/655,172

(22) Filed: May 3, 2024

(65) Prior Publication Data

US 2024/0414449 A1 Dec. 12, 2024

(30) Foreign Application Priority Data

Jun. 7, 2023 (CN) ........................ 202310671368.X

(51) Int. Cl.

| | |
|---|---|
| ***H04N 23/95*** | (2023.01) |
| ***G01S 7/481*** | (2006.01) |
| ***G01S 17/66*** | (2006.01) |
| ***G01S 17/89*** | (2020.01) |
| ***G02B 23/12*** | (2006.01) |
| ***H04N 23/55*** | (2023.01) |

(52) U.S. Cl.

CPC ........... *H04N 23/95* (2023.01); *G01S 7/4816* (2013.01); *G01S 17/66* (2013.01); *G01S 17/89* (2013.01); *G02B 23/12* (2013.01); *H04N 23/55* (2023.01)

(58) Field of Classification Search

CPC ...... H04N 23/95; H04N 23/55; G01S 7/4816; G01S 17/66; G01S 17/89; G02B 23/12

See application file for complete search history.

(56) References Cited

U.S. PATENT DOCUMENTS 9,800,332 B2 * 10/2017 Chalfant, III .......... G02B 13/22
2023/0185021 A1 6/2023 Yu

FOREIGN PATENT DOCUMENTS

CN 107748397 A 3/2018
EP 3420309 B1 * 3/2021 ............. H04N 25/41

* cited by examiner

*Primary Examiner* — Twyler L Haskins
*Assistant Examiner* — John H Morehead, III
(74) *Attorney, Agent, or Firm* — Mei & Mark LLP; Manni Li

(57) ABSTRACT

A method of high-resolution computational imaging through checkerboard constellation-based optical pupil plane interference is provided where a checkerboard constellation-based high-density data acquisition system is adopted to realize high-density sampling of the modulus G of the complex coherence coefficient μ(u, v) of the object, and then the argument angle recovery (also known as phase recovery) algorithms and the image reconstruction algorithms are combined to obtain a clear image. For the optical telescope with ultra-large aperture much larger the rocket envelope, low, medium and high-frequency cameras can be placed on different rocket satellite platforms, launched into an orbit in batches and recombined in the orbit to obtain an equivalent large-optical-aperture imaging optics system, and the equivalent aperture of the system breaks through the limitation of the rocket envelope and can be expanded to 10 meters or above.

6 Claims, 5 Drawing Sheets

METHOD OF HIGH-RESOLUTION COMPUTATIONAL IMAGING THROUGH CHECKERBOARD CONSTELLATION-BASED OPTICAL PUPIL PLANE INTERFERENCE

CROSS-REFERENCE TO RELATED APPLICATION

The subject application claims priority to Chinese patent application no. CN 202310671368.X filed on Jun. 7, 2023 in China. The contents and subject matter of the Chinese priority application is incorporated herein by reference.

TECHNICAL FIELD

The present invention relates to the field of photoelectric imaging, and particularly relates to the field of ultra-high spatial resolution imaging.

BACKGROUND OF INVENTION

In order to explore the mysterious universe and understand the blue planet we live on, scientists are making constant efforts to increase the aperture size of optical space telescopes and improve spatial resolutions. Large-aperture optical telescopes have been developed and improved rapidly in the past half century, helping humans constantly update their understanding of the world. A number of Nobel Prize-winning achievements in physics have been made with the help of advanced optical telescope technology.

Optical space telescopes have unparalleled advantages in terms of observation conditions because they are protected from the atmospheric turbulence of the Earth. However, due to limitation by various factors such as envelope sizes of carrier rockets, it is difficult to enlarge the apertures of the optical space telescopes. Through constant efforts, scientists finally successfully launched James Webb Space Telescope with a segmented aperture to Lagrange L2 point, where the space temperature environment is stable, on the Christmas Day in 2021 after the 2.4 m-aperture Hubble Telescope had been operating in orbit for 30 years. So far, the maximum aperture of the optical space telescopes has reached 6.5 m. Observations through these two optical telescopes make it possible to explain a series of fundamental issues in cosmology. Astronomical scientists eagerly hope that the aperture of the optical space telescopes can exceed ten meters so that larger-aperture and higher-resolution optical space telescopes can be used to explore unknown domains of the universe.

While the technology of astronomical optical space telescopes is improved, optical space telescopes for observing the Earth have also been developed and improved. Following the development of 2.4 m Kanopus-V1 in Russia and the launch of the 2.4 m Keyhole (KH) satellite in the United States, Japan is developing a 3.6 m high-resolution optical telescope for the Earth observation to meet the needs for both rapid response and high-resolution Earth observation so as to mitigate human suffering and damage caused by large-scale disasters. Due to the relatively harsh temperature environment of geostationary orbit and sun-synchronous orbit, the optical space telescopes working in these two orbits currently have single large-aperture optical structures, and public literatures show that the maximum aperture is less than 4 m.

In conclusion, the apertures of optical space telescopes need to exceed 10 m urgently to understand the universe thoroughly, to explore the origin of human beings and the universe, or to respond to emergencies on the blue planet and save humans. To this end, it has not been clear which technical solution can be adopted for developing the optical space telescope with the aperture of larger than 10 m or even 100 m and whether the technical scheme for the James Webb Space Telescope with a segmented aperture can be adopted, or when the aperture of segmented-aperture telescope is enlarged to 10 m, how to break through the rocket fairing envelope limitation and achieve a stable optical wavefront of tens of nanometers after on-orbit splicing. Especially when the telescope is placed in the geostationary orbit or the sun-synchronous orbit with a harsh temperature environment, this task goal is even more difficult to achieve. It is not so clear whether the technical scheme of the ground-based astronomical interferometers are referred to. National Aeronautics and Space Administration (NASA) and European Space Agency (ESA) have taken the lead in launching the free-flyer interferometer project. The Space Interferometry Mission (SIM) is expected to be the first space long-baseline optical interferometer, whose precision of astrometry is estimated to be much higher than that of any other project currently existing or under development. The research in the regard has been always ongoing, but the progress is unclear. Therefore, we need to continue to broaden our way of thinking and explore more solutions.

Common problems in existing large long-baseline interferometers include, firstly, low spatial spectrum coverage. For example, Michigan InfraRed Combiner-eXeter (MIRC-X) installed at the CHARA Array, which once captured images of Altair, is a six-telescope beam combiner that combines the beams of six telescopes placed at fixed positions. MIRC-X is one of the beam combiners capable of combining the largest number of beams in the world, which can achieve the observation of visibility of 15 baselines and 10 closure phases. Because there are few baselines, MIRC-X only relies on the relative motion between stars caused by the Earth's spontaneous rotation to improve the spatial spectrum coverage. In 6 nights of observation of the Vega star, only 25 spatial spectrum points have been captured. Such an imaging system ultimately severely limits low-frequency sampling due to the low spatial spectrum coverage and can only be used for imaging of a simple stellar disk or a binary star system. Secondly, it is difficult to measure the argument angle of the complex coherence coefficient. An astronomical interferometer achieves the phase measurement based on channeled spectrum as follows: commonly using a channeled spectrum to disperse broadband optical signals, recording with an imaging detector, and determining the position of zero optical path difference by observing the number of fringes at different optical paths, so as to achieve the measurement of the argument angle of the complex coherence coefficient. However, in a complex space environment, on a scale of ten meters, tens of meters, or even hundreds of meters, the truss of imaging system might be deformed due to influencing factors such as vibration, heat and gravity gradients, so that the pre-calibrated position of the zero optical path difference might drift and get dislocated. Therefore, the instruments in the operating state need to be calibrated repeatedly according to the reference target. In addition to the channeled spectrum method, a closure phase measurement method is commonly used in the field of astronomical interference. Specifically, three sets of relative phases are obtained by pairing three apertures in pairs. In theory, the closure phase measurement method can eliminate the influence of atmospheric turbulence, but the number of closure phases is always smaller than the number of true phases, so a specific algorithm needs to be designed to solve all true argument angles of the complex coherence coefficients.

When the argument angle of the complex coherence coefficient cannot be measured, scientists try using the recovery algorithm to restore the argument angle and then complete the image reconstruction of the pupil plane interference imaging. A Gerchberg-Saxton (GS) algorithm provides a classic iterative algorithm for solving the problems of this type and is later improved by Fienup to form multiple variants. Since the GS algorithm can be equivalent to an error reduction algorithm among Fienup algorithms, they can be collectively referred to as the Fienup algorithms. Such iterations usually require super-Nyquist spectrum coverage, so the performance of the algorithm has been limited for existing long-baseline interferometers with the low spatial frequency coverage.

SUMMARY OF THE INVENTION

The present invention provides a method of high-resolution computational imaging through checkerboard constellation-based optical pupil plane interference. The method breaks through the limitation of the rocket envelope on optical telescope apertures and provides a technical solution for optical space telescopes that can achieve an equivalent aperture of tens or even hundreds of meters and a new method and thought for high-resolution astronomical and Earth observations. The method of the present invention contributes to a rapid development of optical space telescope technology.

According to the Van Cittert-Zernike Theorem, in the present invention, an incoherent light source with light intensity distribution I ($\xi$, $\eta$) on an object plane can be expressed as a complex coherence coefficient $\mu$ (u, v) at the position of aperture pair ($x_1$, $y_1$) and ($x_2$, $y_2$) of any interference baseline on the equivalent pupil plane of optical system, where u and v represent spatial frequencies, including $u=\Delta x/\bar{\lambda}Z_0$ and $v=\Delta y/\bar{\lambda}Z_0$. ($x_1$, $y_1$), ($x_2$, $y_2$) are the coordinates of two apertures on the pupil plane respectively, $\lambda$ is the average operating wavelength, $\Delta x=x_1-x_2$, $\Delta y=y_1-y_2$, and $Z_0$ is an object distance. The complex coherence coefficient $\mu$ (u, v) is the normalized Fourier transform of the incoherent extended light source distribution I ($\xi$, $\eta$). Therefore, when the complex coherence coefficient $\mu$ (u, v) of the object can be measured, the light source intensity distribution I ($\xi$, $\eta$) can be obtained according to inverse Fourier transform.

The complex coherence coefficient $\mu$ (u, v) includes the modulus G and the argument angle $\phi$ also known as the phase $\phi$), which can be expressed as $\mu=|G|e^{j\Phi}$, and in theory, can be measured according to visibility of interference fringes between aperture pairs of any baseline at the position of zero optical path. The visibility is relatively easy to obtain, but it is not easy to measure the argument angle $\phi$ of light wavelength on a scale of ten meters, tens of meters, or even hundreds of meters.

Based on the above theoretical and technical foundation, the present invention discloses a method of high-resolution computational imaging through checkerboard constellation-based optical pupil plane interference.

The present invention provides a method of high-resolution computational imaging through checkerboard constellation-based optical pupil plane interference comprising the steps of providing a checkerboard constellation-based high-density data acquisition system, using the checkerboard constellation-based high-density data acquisition system to conduct high-density sampling of a modulus G of a complex coherence coefficient $\mu$(u, v) of an object, combining an argument angle recovery (phase recovery) algorithm and an image reconstruction algorithm, and obtaining an image that satisfies constraints based on the combination of the algorithms.

In the present invention, the checkerboard constellation-based high-density data acquisition system comprises a single-aperture camera and a plurality of checkerboard imagers with different minimum baselines.

In the present invention, the method may further comprise the steps of dividing the checkerboard constellation-based high-density data acquisition system according to baseline length of aperture pair in the checkerboard imager into an aperture pair array low-frequency camera with short baseline, an aperture pair array medium-frequency camera with medium baseline, and an aperture pair array high-frequency camera with long baseline, when an equivalent ultra-large-aperture optical telescope of the checkerboard constellation-based high-density data acquisition system is larger than a rocket envelope and a maximum baseline of the checkerboard imager in the checkerboard constellation-based high-density data acquisition system exceeds the rocket envelope, placing the aperture pair array cameras with the short, medium, and long baselines on different satellite platforms, respectively, and setting up the checkerboard constellation-based high-density data acquisition system by launching and on-orbit assembly in batches.

In the present invention, the method may further comprise the steps of replacing the aperture pair array low-frequency camera with short baseline by a single-aperture camera to obtain low spatial spectrum information of the object.

In the present invention, the checkerboard constellation-based high-density data acquisition system comprises a relatively moving aperture pairs, wherein an aperture 1 of a satellite A is relatively stationary, an aperture 2 of a satellite B moves in steps relative to the aperture 1 of the satellite A along a predetermined path, and every time when aperture 2 of satellite B moves by one step, the checkerboard constellation-based high-density data acquisition system completes a sampling of the modulus G of the complex coherence coefficient $\mu$(u, v) of the object; and after a predetermined trajectory motion and sampling is completed, the high-density sampling of the modulus G of an object-light complex coherence coefficient $\mu$(u, v) within a range limited by the maximum baseline is completed.

In the present invention, the method may further comprise the steps of improving a capability of the argument angle recovery algorithm and the image reconstruction algorithm and lowering a density of the high-density sampling to be lower than the Nyquist frequency.

BRIEF DESCRIPTION OF THE DRAWINGS

FIG. 2A shows the working principle, FIG. 2B is an enlarged view of the square in the layer marked 102, and FIG. 2C is an enlarged view of the square in the layer marked 104.

FIG. 4A shows the optical telescope with equivalent ultra-large aperture in the present invention; FIG. 4B shows those recombed in the orbit; and FIG. 4C shows those launched in batches.

FIG. 6A shows an original image inputted for a simulation; FIG. 6B shows the distribution of moduli G of complex coherence coefficients (u, v) corresponding to the range of 0 to 18 m baseline in spatial frequency domain of the original image; FIG. 6C shows the simulation of imaging effect of a single-aperture camera with an aperture of 3.5 m; FIG. 6D shows the image reconstructed based on the data obtained at 1-times Nyquist frequency of sampling through the single-aperture camera with a aperture of 3.5 m, in case of sampling at the 1-times Nyquist frequency through a checkerboard aperture pair array; FIG. 6E shows the image reconstructed based on the data obtained at 2-times Nyquist frequency of sampling through a single-aperture camera with an aperture of 3.5 m, in case of sampling at the 2-times Nyquist frequency through a checkerboard aperture pair array; and FIG. 6F shows the image reconstructed based on data obtained at 3-times Nyquist frequency of sampling through a single-aperture camera with an aperture of 3.5 m, in case of sampling at the 3-times Nyquist frequency through a checkerboard aperture pair array. All the vertical axes in FIGS. 6A to 6F are shown in unit Y/m.

Figure 1:
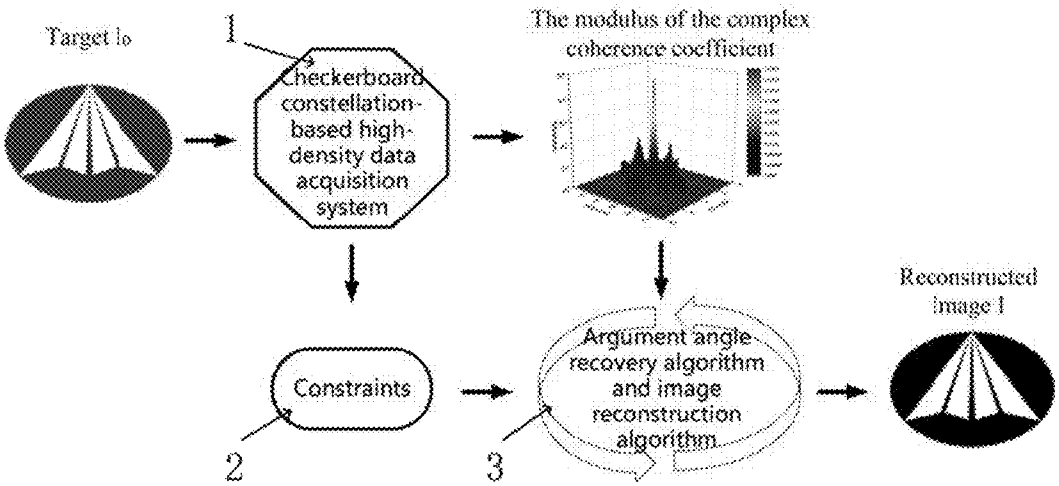
FIG. 1 shows the working principle of the method of high-resolution computational imaging through checkerboard constellation-based optical pupil plane interference in the present invention.

Reference numbers used in the drawings are referring to the following structures: 1—checkerboard constellation-based high-density data acquisition system, 2—constraints, 3—argument angle recovery algorithm and image reconstruction algorithm; 101—aperture pair checkerboard array of different baselines, 102—waveguide grating array, 103—array of paired single-mode fiber, 104—phase retarder array, 105—photoelectric detection and readout system; 106—checkerboard imager 1 with a minimum baseline $B_{min\_1}$=D, 107—checkerboard imager 2 with a minimum baseline $$B_{min\_2} = \left(1 + \frac{1}{4}\right)D,$$

108—checkerboard imager 3 with a minimum baseline $$B_{min\_3} = \left(1 + \frac{1}{2}\right)D,$$

109—checkerboard imager 4 with a minimum baseline $$B_{min\_4} = \left(1 + \frac{3}{4}\right)D,$$

110—conventional single-aperture camera; 111—aperture pair array low-frequency camera with short baseline, 112—aperture pair array medium-frequency camera with medium baseline, 113—aperture pair array high-frequency camera with long baseline, 114—aperture pair array high-frequency camera with long baseline.

DETAILED DESCRIPTION OF THE INVENTION AND EMBODIMENTS

The present invention provides a method that is based on the principle of computational imaging through optical pupil plane interference and adopts a checkerboard constellation-based high-density data acquisition system to realize high-density sampling of the modulus G of the complex coherence coefficient μ (u, v) of the object. An argument angle recovery (also known as phase recovery) algorithm and an image reconstruction algorithm are combined to obtain a clear image of the object that satisfies certain constraints as shown in FIG. 1. As shown in FIG. 1, the checkerboard constellation-based high-density data acquisition system 1 generally comprises a single-aperture camera and a plurality of checkerboard imagers with different minimum baselines that can achieve high-density sampling of the modulus G of the complex coherence coefficient μ (u, v). The constraints 2 in the process of the method are generally determined based on specific structural parameters of the checkerboard constellation-based high-density data acquisition system and the imaging object distance. The argument angle recovery algorithm and the image reconstruction algorithm 3, based on high-density the modulus G of the complex coherence coefficient μ (u, v), maximize their effect, and after iterative optimization of the algorithms, clear images with high spatial resolution are obtained. During the initial iterative optimization of the argument angle recovery algorithm and the image reconstruction algorithm, a random image is brought into the spatial domain, and the argument angle ϕ of the complex coherence coefficient μ (u, v) in spatial frequency domain is obtained through the physical transmission model of the checkerboard constellation-based high-density data acquisition system and is combined with the measured high-density modulus G of the complex coherence coefficient μ (u, v). In the iterative optimization process, when a reconstructed image satisfies the constraints of the spatial frequency domain or the frequency domain, the optimization ends and a clear image is output.

Figure 2A:
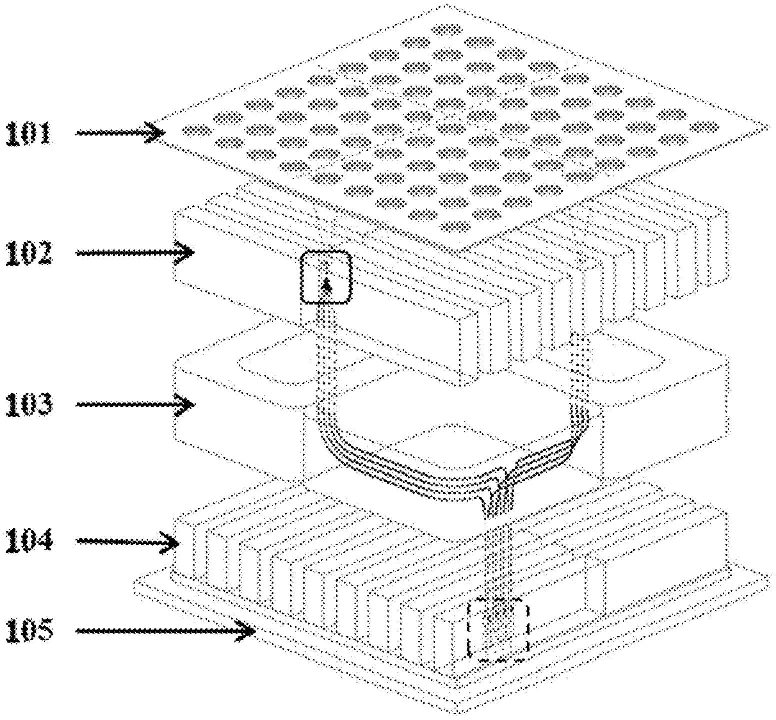
FIGS. 2A to 2C show the working principle of the checkerboard imager in the present invention, where
Figure 2B:
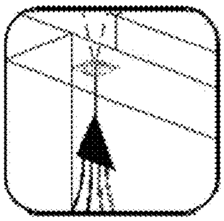
Figure 2C:
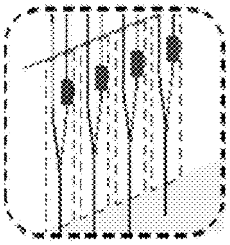

In order to obtain a high sampling rate of the modulus of the complex coherence coefficient in the spatial frequency domain, the checkerboard constellation-based high-density data acquisition system 1 of the present invention uses a checkerboard-type rectangular aperture pair for array structure and sampling method. For details, refer to Chinese invention patent No. 201711000143.2, which is incorporated herein by reference. The sampling method achieves continuous sampling of the modulus without non-redundance and omission within the spatial frequency range limited by the longest baseline. An information acquisition system of the checkerboard imager is adopted. For details, please refer to Chinese invention patent No. 202010965700.X, which is incorporated herein by reference. As shown in FIGS. 2A to 2C, an object light is collected through an aperture pair checkerboard array (101) of different baselines, and then transmitted through the waveguide grating splitting array (102) and the paired single-mode fiber array (103), where the coherence is controlled. Through scanning coherence envelope with the phase retarder (104), a photoelectric detection and readout system (105) obtains the modulus G of the complex coherence coefficient μ (u, v) at different spatial frequencies.

During the signal acquisition process, the phase retarders behind each paired aperture with different baselines in the checkerboard imager are adjusted so that the position crossing the zero optical path difference of each paired optical path is scanned and the contrast of the interference fringes is collected and stored to obtain the modulus G of the full-space spectrum complex coherence coefficient μ (u, v) within a range limited by the maximum baseline. However, an optical pupil plane interference imaging system of a single checkerboard imager has a system field of view $$FoV = 2\frac{\lambda}{D}$$

limited by the sub-aperture size D, where λ is the working wavelength, corresponding to the characteristic period $u_o=1/FoV$ of the spatial frequency domain and also corresponding to 1-times Nyquist sampling frequency. According to a sampling theorem, for an extended target, a period $u_c=B_{min}/\lambda$ of sampling in a spatial frequency domain should be smaller than the characteristic period $u_o$ corresponding to the field of view, where a minimum interval of the sampling baseline is $$B_{min} < \frac{D}{2}.$$

Figure 3:
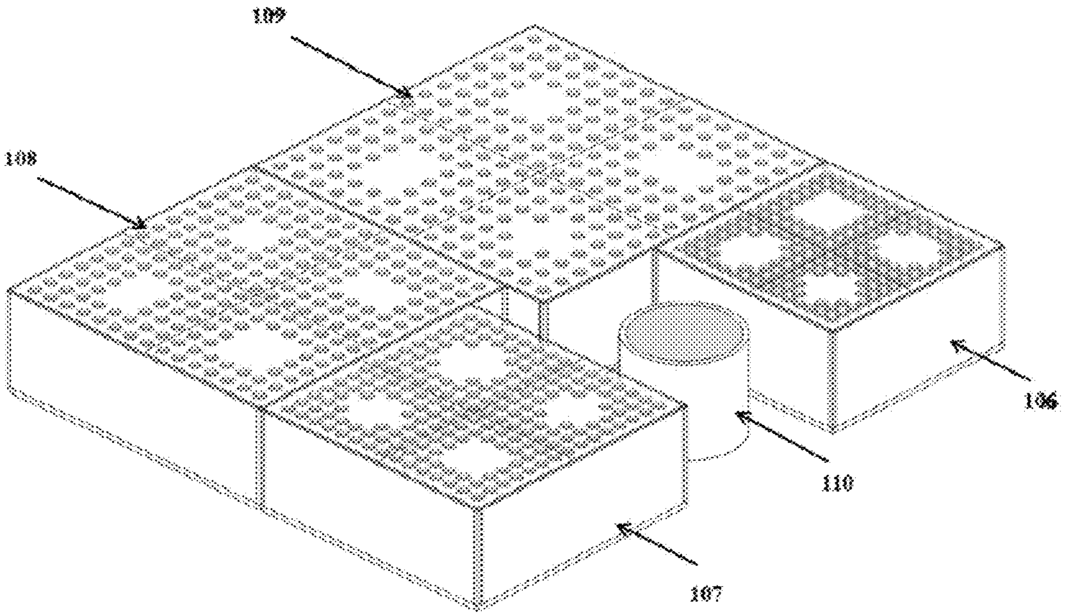
FIG. 3 shows a constellation comprising a single-aperture camera and a plurality of checkerboard imagers with unequal minimum baselines in the present invention.

Obviously, the single checkerboard aperture pair array cannot meet sampling requirements. In order to meet the sampling requirements and avoid physical overlap in space, the checkerboard constellation-based high-density data acquisition system 1 comprises one conventional single-aperture camera and a plurality of checkerboard aperture pair arrays with different minimum baselines. Taking the realization of 2 times of the Nyquist frequency as an example, the high-density acquisition system of the modulus G of the complex coherence coefficient μ (u, v) in the spatial frequency domain comprises 5 optical systems, including 4 checkerboard imagers and 1 single-aperture camera, which form a constellation as shown in FIG. 3. The minimum baseline corresponding to the checkerboard imager 1 (106) is $B_{min\_1}=D$; the minimum baseline corresponding to the checkerboard imager 2 (107) is $$B_{min\_2} = \left(1+\frac{1}{4}\right)D;$$

the minimum baseline corresponding to the checkerboard imager 3 (108) is $$B_{min\_3} = \left(1+\frac{1}{2}\right)D;$$

and the minimum baseline corresponding to the checkerboard imager 4 (109) is $$B_{min\_4} = \left(1+\frac{3}{4}\right)D.$$

Because the modulus G of the complex coherence coefficient μ (u, v) in the spatial frequency domain where the corresponding baseline $B_{min}$ is less than D cannot be obtained through the aperture pair interference, one conventional single-aperture camera (110) is needed to obtain the image, and then the modulus G of the complex coherence coefficient μ (u, v) in the spatial frequency domain is obtained by inversion. Because the corresponding aperture or baseline length of the conventional single-aperture camera is small, the acquired data corresponds to low-frequency information of the spatial frequency domain.

Figure 4A:
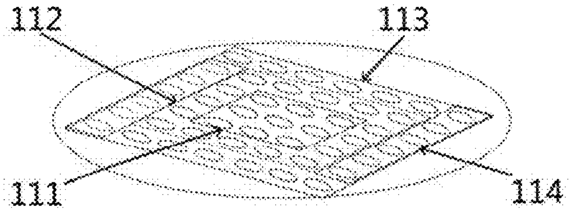
FIGS. 4A to 4C show the process of obtaining an equivalent ultra-large-aperture optical telescope by in-orbit recombination of the optical interference array launched in batches in the present invention, where
Figure 4B:
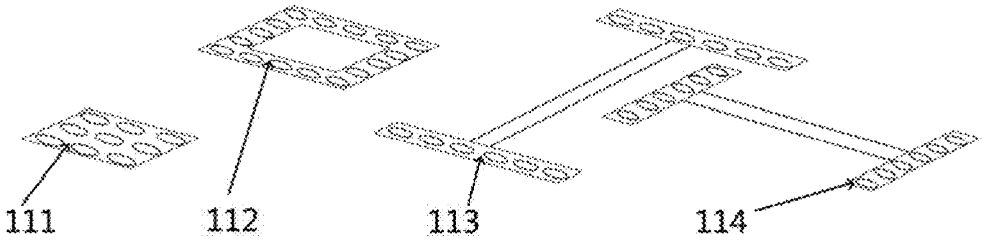
Figure 4C:
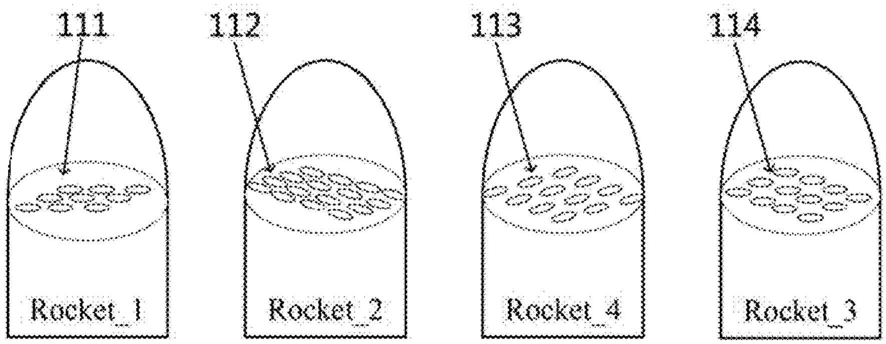

Based on the above working principle, the checkerboard imagers for the checkerboard constellation-based high-density data acquisition system of the present invention realizes the discrete acquisition of the modulus G of the complex coherence coefficient μ (u, v) of the target within the range limited by the maximum baseline through the aperture pair array with different baselines. Therefore, when an equivalent ultra-large-aperture optical telescope of the checkerboard constellation-based high-density data acquisition system is much larger than the rocket envelope, that is, when the maximum baseline of the checkerboard imager in the checkerboard constellation-based high-density data acquisition system exceeds the rocket envelope, the data acquisition system, according to the baseline length of aperture pair in the checkerboard imager, can be divided into the aperture pair array low-frequency camera with short baseline, the aperture pair array medium-frequency camera with medium baseline, and the aperture pair array high-frequency camera with long baseline. Aperture pair array cameras with different baselines can be placed on different satellite platforms and set up by launching and on-orbit assembly in batches. As shown in FIGS. 4A to 4C, for example, the aperture pair array low-frequency camera (111) with short baseline is placed on satellite platform rocket_1, and the aperture pair array medium-frequency camera (112) with medium baseline is placed on satellite platform rocket_2. Aperture pair array high-frequency cameras (113, 114) with long baseline can be separated and placed on satellite platform rocket_3 and satellite platform rocket_4 according to space requirements. After being launched into orbit, they can be reassembled to obtain an equivalent ultra-large-aperture optical telescope. The aperture pair array low-frequency camera with short baseline can be replaced by a conventional single-aperture camera to obtain low spatial spectrum information of the targets. Therefore, low-frequency cameras are generally conventional single-aperture cameras.

Figure 5:
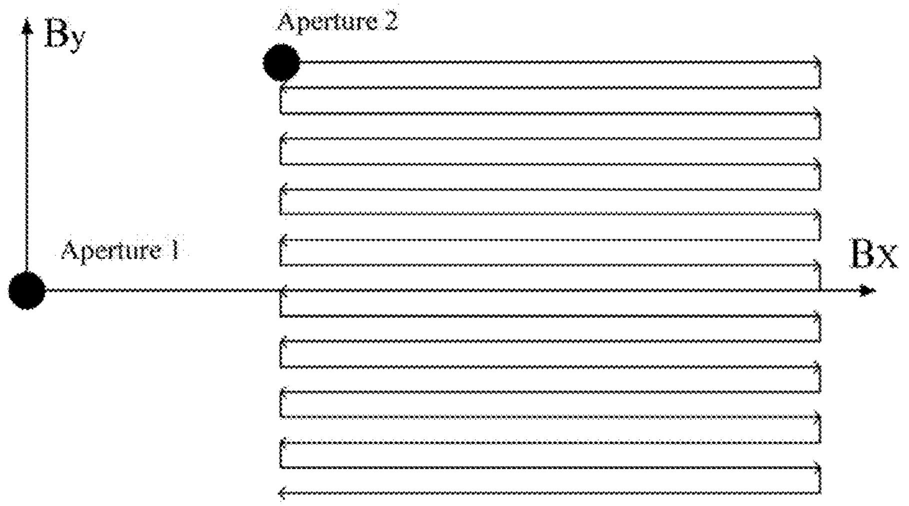
FIG. 5 shows the relative motion paths of two apertures in the present invention.

When detecting and imaging non-transient targets such as uninhabited islands and national border lines, the checkerboard constellation-based high-density data acquisition system comprises relatively moving aperture pairs. As shown in FIG. 5, aperture 1 of satellite A is relatively stationary, aperture 2 of satellite B moves in steps relative to –aperture 1 of satellite A along a predetermined path, and every time when aperture 2 of satellite B moves by one step, the system completes one sampling of the modulus G of the complex coherence coefficient μ(u, v) of the object. After the predetermined trajectory motion and sampling is completed, the high-density sampling of the modulus G of an object-light complex coherence coefficient μ(u, v) within the range limited by the maximum baseline is completed. A conventional single-aperture camera can be used for sampling in a low spatial spectrum area covered by the aperture pair array with short baseline in relative motion, that is, a motion range of an aperture pair in relative motion covers a medium- and high-frequency area other than the low frequency area covered by the conventional single-aperture camera.

In summary, the present invention provides a method of high-resolution computational imaging through checkerboard constellation-based optical pupil plane interference. The method, based on the principle of computational imaging through optical pupil plane interference, adopts a checkerboard constellation-based high-density data acquisition system composed of a conventional single-aperture camera and a plurality of checkerboard aperture pair arrays with different minimum baselines, and realizes high-density sampling of the modulus G of the complex coherence coefficient μ(u, v) of the object. And then the argument angle recovery algorithm and the image reconstruction algorithm are combined to obtain the clear image that satisfies certain constraints. When an ultra-large-aperture optical telescope is much larger than the rocket envelope, that is, when the maximum baseline thereof exceeds the rocket envelope, the technical route of in-batch launching and on-orbit assembly of a plurality of satellites are implemented. The low-frequency camera with short baseline, the medium-frequency camera with medium baseline, and the high-frequency camera with long baseline are placed on different rocket satellite platforms and launched into an orbit in batches and recombined in the orbit to obtain an equivalent ultra-large-optical-aperture imaging optics system, and the equivalent optical aperture of the system breaks through the limitation of the rocket envelope and can be expanded to 10 meters or above.

A sampling density of the modulus G of the object-light complex coherence coefficient μ(u, v) for high-density sampling is higher than Nyquist frequency. However, after the capability of the argument angle recovery algorithm and the image reconstruction algorithm is improved, the sampling density can be lower than Nyquist frequency.

Example 1

Figure 6A:
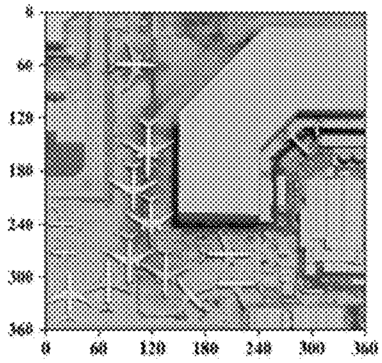
FIGS. 6A to 6F show the simulation effects of the Earth observation imaging from the geostationary orbit in the present invention, where
Figure 6B:
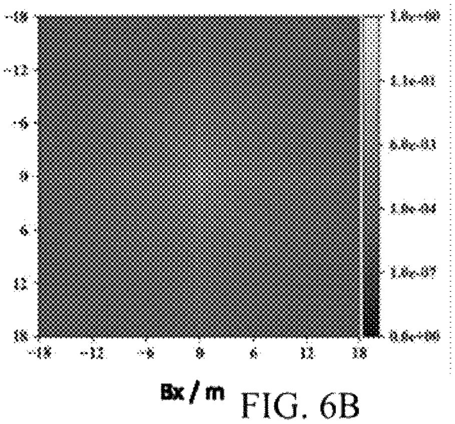
Figure 6C:
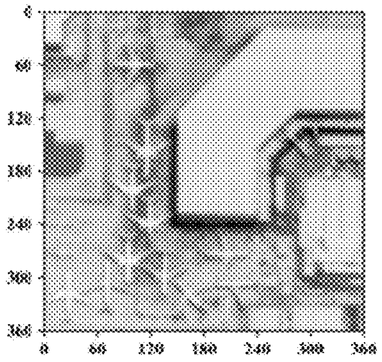
Figure 6D:
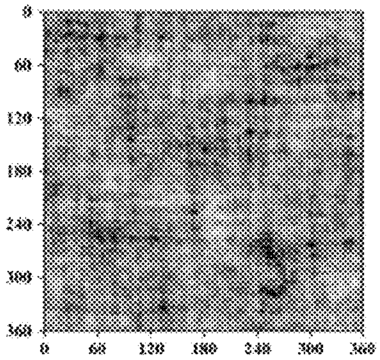
Figure 6E:
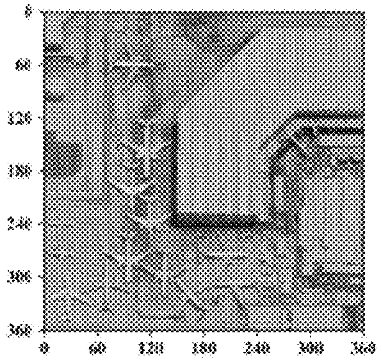
Figure 6F:
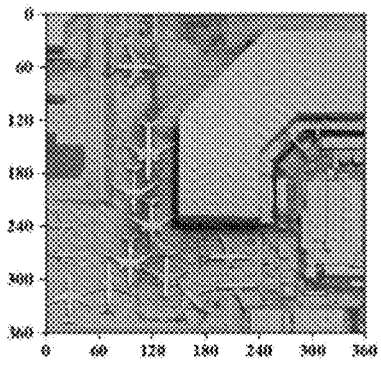

In order to achieve an imaging effect of a visible light camera with a central wavelength of 500 nm operating in a geostationary orbit of 36,000 km with an Earth observation width of 360 m and an imaging resolution of 0.5 m, the maximum baseline $B_{max}$ of an optical space telescope is required to be 18 m. A single-aperture camera with an aperture of 3.5 m is used as a low-frequency camera for low-frequency information acquisition. Within the baseline range of 3.5 m to 18 m, the checkerboard aperture pair array camera with the minimum baseline of 100 mm is used to collect high-frequency information. The original image for simulating the imaging from the geostationary orbit is shown in FIG. 6A. FIG. 6B shows the distribution of moduli G of complex coherence coefficients (u, v) corresponding to the baseline range of 0 to 18 m in the spatial frequency domain of the original image. When only one single-aperture camera with an aperture of 3.5 m is used for imaging, the imaging effect is shown in FIG. 6C. FIG. 6D shows the image reconstructed based on data obtained at 1-times Nyquist frequency of sampling through a single-aperture camera with an aperture of 3.5 m, in case of sampling at the 1-times Nyquist frequency through a checkerboard aperture pair array. FIG. 6E shows the image reconstructed based on data obtained at 2-times Nyquist frequency of sampling through a single-aperture camera with an aperture of 3.5 m, in case of sampling at the 2-times Nyquist frequency through a checkerboard aperture pair array. FIG. 6F shows the image reconstructed based on data obtained at 3-times Nyquist frequency of sampling through a single-aperture camera with an aperture of 3.5 m, in case of sampling at the 3-times Nyquist frequency through a checkerboard aperture pair array. It can be seen from the simulation effect shown in FIGS. 6A to 6F that the checkerboard constellation-based high-resolution imaging system can accurately reconstruct the object scene information when sampling at 2-times Nyquist frequency, while the image quality is further improved at 3-times Nyquist frequency of sampling. Based on the simulation results, it is determined that the checkerboard constellation-based high-resolution imaging system adopts a configuration of sampling at 2-times Nyquist frequency, including the 3.5 m single-aperture camera and 4 checkerboard aperture pair array pupil plane interference systems. The baseline span of the four checkerboard aperture pair array pupil plane interference systems ranges from 3.5 m to 18 m, minimum baseline lengths are 100 mm, 125 mm, 150 mm and 175 mm respectively, and high-density sampling at a super-Nyquist frequency is achieved. In the process of iterative optimization of data processing, the continuous Hybrid Input Output (HIO) algorithm in the Fienup algorithm family is used for argument angle recovery (phase recovery) and image reconstruction.

The foregoing is merely a preferred embodiment of the present invention and is not intended to limit the patent scope of the present invention. Any equivalent structure or equivalent process transformation made by using the description of the present invention and the contents of the accompanying drawings, or directly or indirectly used in other related technical fields, are all similarly included in the scope of patent protection of the present invention.

I claim:

1. A method of high-resolution computational imaging through checkerboard constellation-based optical pupil plane interference, comprising providing a checkerboard constellation-based high-density data acquisition system, conducting high-density sampling of a modulus G of a complex coherence coefficient μ(u, v) of an object by the checkerboard constellation-based high-density data acquisition system, recovering an argument angle ϕ of the complex coherence coefficient μ(u, v) of the object and reconstructing the image based on the high-density sampling of the modulus G by iterative algorithm, wherein the iterative algorithm is Gerchberg-Saxton algorithm or Fienup algorithm and satisfies constraints imposed by structural parameters of the checkerboard constellation-based high-density data acquisition system and a distance between the checkerboard constellation-based high-density data acquisition system and the object.

2. The method according to claim 1, wherein the checkerboard constellation-based high-density data acquisition system comprises a single-aperture camera and a plurality of checkerboard imagers with different minimum baselines.

3. The method according to claim 2, further comprising dividing the checkerboard constellation-based high-density data acquisition system according to baseline length of aperture pair in the checkerboard imager into an aperture pair array low-frequency camera with short baseline, an aperture pair array medium-frequency camera with medium baseline, and an aperture pair array high-frequency camera with long baseline, when an equivalent ultra-large-aperture optical telescope of the checkerboard constellation-based high-density data acquisition system is larger than a rocket envelope and a maximum baseline of the checkerboard imager in the checkerboard constellation-based high-density data acquisition system exceeds the rocket envelope, placing the aperture pair array cameras with the short, medium, and long baselines on different satellite platforms, respectively, and setting up the checkerboard constellation-based high-density data acquisition system by launching and on-orbit assembly in batches.

4. The method according to claim 3, further comprising replacing the aperture pair array low-frequency camera with short baseline by a single-aperture camera to obtain low spatial spectrum information of the object.

5. The method according to claim 1, wherein the checkerboard constellation-based high-density data acquisition system comprises an aperture pair, wherein the aperture pair consists of an aperture 1 of satellite A and an aperture 2 of satellite B, wherein the aperture 1 of the satellite A is stationary, the aperture 2 of the satellite B moves in steps relative to the aperture 1 of the satellite A along a predetermined path, and every time when the aperture 2 of the satellite B moves by one step, the checkerboard constellation-based high-density data acquisition system completes a sampling of the modulus G of the complex coherence coefficient μ(u, v) of the object; and after a predetermined trajectory motion and sampling is completed, the high-density sampling of the modulus G of an object-light complex coherence coefficient μ(u, v) within a range limited by the maximum baseline is completed.

6. The method according to claim 1, wherein a density of the high-density sampling is adjusted to be lower than a Nyquist frequency of the high-density sampling.

* * * * *